US008923763B2

(12) United States Patent
O'Donoghue et al.

(10) Patent No.: US 8,923,763 B2
(45) Date of Patent: Dec. 30, 2014

(54) METHODS AND APPARATUSES FOR REDUCING THE NONVOLATILE MEMORY USED TO SUPPORT APPLICATION IDENTIFIER ROUTING IN AN NFC CONTROLLER

(71) Applicant: QUALCOMM Incorporated, San Diego, CA (US)

(72) Inventors: Jeremy R. O'Donoghue, Wokingham (GB); John Hillan, Farnborough (GB); Neeraj Bhatia, San Francisco, CA (US); Alan Gillespie, Farnborough (GB); Anssi Kaleva Haverinen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 165 days.

(21) Appl. No.: 13/670,008

(22) Filed: Nov. 6, 2012

(65) Prior Publication Data
US 2013/0225073 A1 Aug. 29, 2013

Related U.S. Application Data

(60) Provisional application No. 61/604,119, filed on Feb. 28, 2012.

(51) Int. Cl.
*H04B 5/00* (2006.01)

(52) U.S. Cl.
USPC ........................................................ 455/41.1

(58) Field of Classification Search
USPC .............................. 455/41.1, 41.2; 726/26, 27
See application file for complete search history.

(56) References Cited

U.S. PATENT DOCUMENTS

| 7,145,906 | B2 | 12/2006 | Fenner |
| 7,965,297 | B2 | 6/2011 | Hoppe |
| 2010/0091995 | A1 | 4/2010 | Chen et al. |
| 2010/0227553 | A1 | 9/2010 | Charrat et al. |
| 2011/0227790 | A1 | 9/2011 | Li et al. |
| 2012/0011572 | A1 | 1/2012 | Chew et al. |
| 2012/0259822 | A1* | 10/2012 | Medgyesi et al. ............ 707/693 |
| 2013/0078949 | A1* | 3/2013 | Pecen et al. ................... 455/411 |
| 2013/0173736 | A1* | 7/2013 | Krzeminski et al. .......... 709/213 |

FOREIGN PATENT DOCUMENTS

DE 102009059939 A1 6/2011

OTHER PUBLICATIONS

International Search Report and Written Opinion—PCT/US2013/028375—ISA/EPO—Jun. 20, 2013.

* cited by examiner

*Primary Examiner* — Nguyen Vo
(74) *Attorney, Agent, or Firm* — Charles E. Eggers

(57) ABSTRACT

The present application presents example data routing methods and apparatuses for reducing the amount of nonvolatile memory required to store secure element application locations associated with a near-field communications device. For example, the present disclosure presents a method of communication routing in a near-field communication device, which can include receiving, at a near-field communications controller (NFCC), a routing request message (e.g. from a requesting device), wherein the routing request message includes an original application identifier (AID) associated with an application. The example method may also include generating a compressed AID by applying a hash function to the original AID, reading an entry corresponding to the compressed AID in a routing data structure, wherein the entry contains one or more secure element pointers associated with one or more secure elements, and querying at least one of the secure elements to determine whether each contains the application.

24 Claims, 6 Drawing Sheets

US 8,923,763 B2

METHODS AND APPARATUSES FOR REDUCING THE NONVOLATILE MEMORY USED TO SUPPORT APPLICATION IDENTIFIER ROUTING IN AN NFC CONTROLLER

CLAIM OF PRIORITY UNDER 35 U.S.C. §119

The present Application for Patent claims priority to Provisional Application No. 61/604,119 entitled "Methods and Apparatuses for Reducing the Nonvolatile Memory Used to Support Application Identifier Routing in an NFC Controller" filed Feb. 28, 2012, and assigned to the assignee hereof and hereby expressly incorporated by reference herein.

BACKGROUND

1. Field

The disclosed aspects relate generally to communications between and/or within devices and specifically to methods and systems for improving near field communication (NFC) routing information storage.

2. Background

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Many such cellular telephones are being manufactured with relatively large increases in computing capabilities, and as such, are becoming tantamount to small personal computers and hand-held PDAs. Further, such devices are being manufactured to enable communications using a variety of frequencies and applicable coverage areas, such as cellular communications, wireless local area network (WLAN) communications, near field communication (NFC), etc.

In a typical NFC system, there may exist a communications device that includes a device host (DH), a near field communication controller (NFCC), and one or more secure elements (SEs), where the NFCC may store one or more routing tables in a nonvolatile memory. These routing tables typically govern message and data routing from external devices and/or internal NFC device components to and from the one or more SEs. As the number of SEs and their related application identifiers (AIDs) in an NFC device grows, so does the amount of routing information that must be stored in a data table to route an application request from an external device to the cored SE. The nonvolatile memory that this routing information is stored on, however, is costly. Therefore, it follows that adding SEs in an NFC device will drive up costs to the manufacturer and/or consumer by way of additional nonvolatile memory to support routing information for the SEs.

Thus, improved methods and apparatuses for improving NFC routing information storage are desirable.

SUMMARY

The following presents a summary of one or more aspects to provide a basic understanding of such aspects. This summary is not an extensive overview of all contemplated aspects, and is not intended to identify key or critical elements of all aspects nor delineate the scope of any or all aspects. Its purpose is to present some concepts of one or more aspects form as a prelude to the more detailed description presented later.

In accordance with one or more aspects and corresponding disclosure thereof, various aspects are described in connection with improving routing operations associated with application requests in near-field communications devices. For example, in some examples according to the present disclosure, a method for improved routing may include receiving, at a near-field communications controller, a routing request message from a requesting device. In an aspect, the routing request message may include an original application identifier (AID) associated with an application. In addition, the example method may include generating a compressed AID by applying a hash function to the original AID and reading an entry corresponding to the compressed AID in a routing data structure. In an aspect, the entry may contain one or more secure element pointers associated with one or more secure elements. Furthermore, the method may involve querying at least one of the one or more secure elements to determine whether each contains the application.

In addition, the present disclosure presents example apparatuses for such improved routing operations, which may include means for receiving, at an NFCC, a routing request message from a requesting device. In an aspect, the routing request message may include an original AID associated with an application. Additionally, such example apparatuses may include means for generating a compressed AID by applying a hash function to the original AID and means for reading an entry corresponding to the compressed AID in a routing data structure. In an aspect, the entry may contain one or more secure element pointers associated with one or more secure elements. Moreover, these example apparatuses may include means for querying at least one of the one or more secure elements to determine whether each contains the application.

Furthermore, the present disclosure presents computer-readable medium storing executable code for receiving, at an NFCC, a routing request message from a requesting device. In an aspect, the routing request message may include an original AID associated with an application, and code for generating a compressed AID by applying a hash function to the original AID. Such example computer-readable media may include code for reading an entry corresponding to the compressed AID in a routing data structure. In an aspect, the entry may contain one or more secure element pointers associated with one or more secure element, and code for querying at least one of the one or more secure elements to determine whether each contains the application.

Moreover, the present disclosure describes an apparatus for communication routing in NFCC devices, which may include a receiver configured to receive, at an NFCC, a routing request message from a requesting device. In an aspect, the routing request message may include an original AID associated with an application, a compression component configured to generate a compressed AID by applying a hash function to the original AID, a data routing component configured to read an entry corresponding to the compressed AID in a routing data structure. In an aspect, the entry may contain one or more secure element pointers associated with one or more secure elements, and a secure element querying component configured to query at least one of the one or more secure elements to determine whether each contains the application.

To the accomplishment of the foregoing and related ends, the one or more aspects comprise features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Generally, a near field communication (NFC) device maintains data routing information in one or more routing data structures in an NFC controller (NFCC) located at the NFC device. These routing data structures may control data flow in a NFC environment between external devices and the NFC device and/or modules internal to the NFC environment. For example, an external device may attempt to access application data that is located in a SE in the NFC device. The location of such application data may be tied to its hosting SE by storing an application identifier (AID) in a nonvolatile memory in the NFCC. In an aspect of the present disclosure, an NFC device may store one or more AIDs in the routing data structure according to a hash function, thereby compressing the data. Thereafter, when an external device or internal module requests application data stored in an SE, the NFCC may hash the AID located in a request message and read the one or more entry locations in the routing data structure corresponding to the hashed AID value. In this way, data storage usage on the costly nonvolatile memory housing the routing data structure may be lessened.

Figure 1:
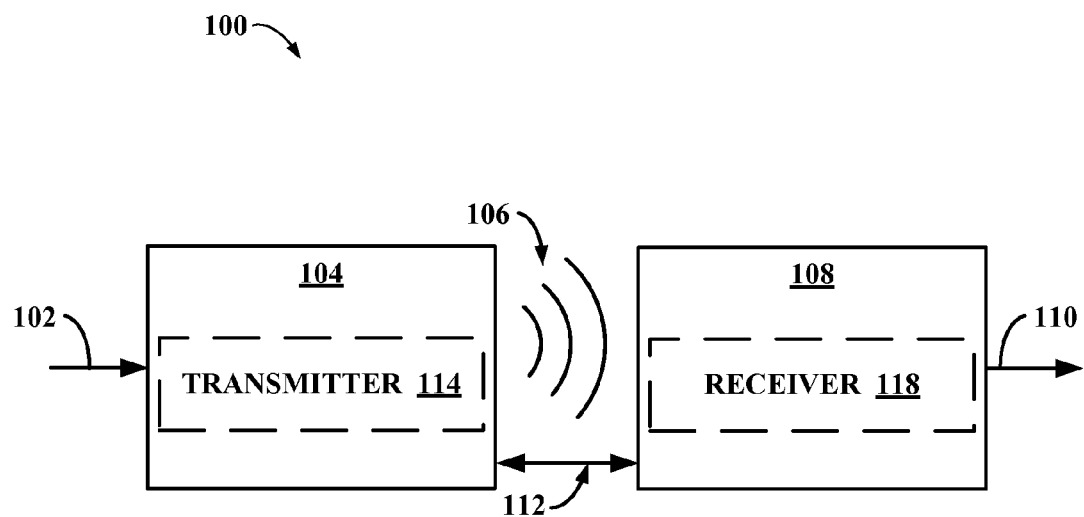
FIG. 1 is a simplified block diagram of a near field wireless communication system according to an aspect.

FIG. 1 illustrates a wireless communication system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
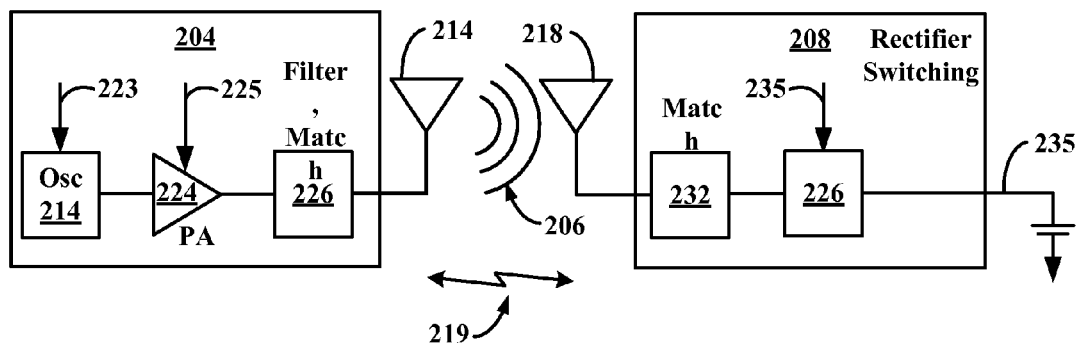
FIG. 2 is a simplified schematic diagram of a near field communication transfer system according to an aspect.

FIG. 2 shows a simplified schematic diagram of a near field wireless communication system. The transmitter 204 includes an oscillator 222, a power amplifier 224 and a filter and matching circuit 226. The oscillator is configured to generate a signal at a desired frequency, which may be adjusted in response to adjustment signal 223. The oscillator signal may be amplified by the power amplifier 224 with an amplification amount responsive to control signal 225. The filter and matching circuit 226 may be included to filter out harmonics or other unwanted frequencies and match the impedance of the transmitter 204 to the transmit antenna 214.

The receiver 208 may include a matching circuit 232 and a rectifier and switching circuit 234 to generate a DC power output to charge a battery 236 as shown in FIG. 2 or power a device coupled to the receiver (not shown). The matching circuit 232 may be included to match the impedance of the receiver 208 to the receive antenna 218. The receiver 208 and transmitter 204 may communicate on a separate communication channel 219 (e.g., Bluetooth, Zigbee, cellular, etc).

Figure 3:
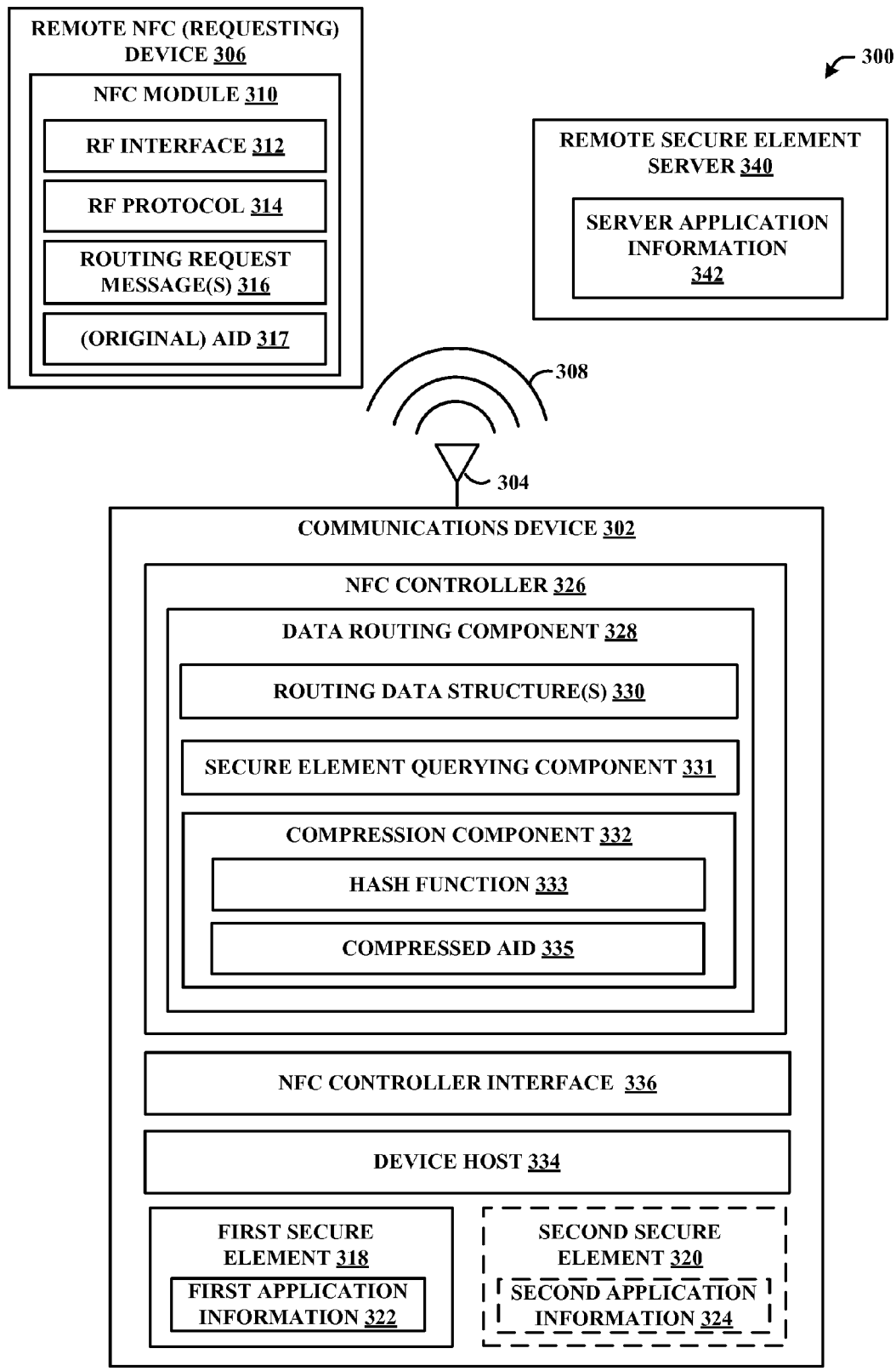
FIG. 3 is a block diagram of a NFC environment according to an aspect.

With reference to FIG. 3, a block diagram of a communication network 300 according to an aspect is illustrated. Communication network 300 may include communications devices 302 which, through antenna 304, may be in communication with a remote NFC device 306 using one or more NFC technologies 308 (e.g., NFC-A, NFC-B, NFC-F, etc.). In an aspect, remote NFC device 306 and/or communications device 302 may be operable to communicate through NFC module 310 through one or more RF interfaces 312 using one or more RF protocols 314, in either an active or passive communication mode. In another aspect, communications device 302 may be operable to be connected to an access network and/or core network (e.g., a CDMA network, a GPRS network, a UMTS network, and other types of wireline and wireless communication networks). In an aspect, remote NFC device 306 may include but is not limited to a remote NFC tag, a reader/writer device, a peer initiator device, a remote peer target device, etc.

In a further aspect, remote NFC device 306 (e.g., through NFC module 310) may generate and transmit one or more routing request messages 316, which, in a non-limiting aspect, may query communications device 302 for or otherwise request routing information or other information corresponding to the location of one or more applications. Furthermore, in an aspect, each of the one or more applications for which routing or location information is requested may contain an associated application identifier (AID), which may be transmitted with (e.g. in serial or parallel) a routing request message 316. As a result, remote NFC device 306 may, in some non-limiting examples presented in the present application, be referred to as a requesting device.

In another aspect, communications device 302 may include one or more secure elements, such as, but not limited to, first secure element 318 and optionally a second secure element 320. In addition, first secure element 318 may include first application information 322 and an optional second secure element 320 may include second application information 324. Although two secure elements are depicted in FIG. 3, one of ordinary skill in the art would appreciate that the communications device 302 may include any number of additional secure elements (not shown) each of which may likewise store application data. In an aspect, first and/or second secure elements 318 and/or 320 may be operable to communicate with NFC controller 326. Further, first and/or second secure elements 318 and/or 320 may include one or more applications that are operable to request access to various functionalities availability through NFC controller 326. In an aspect, first and/or second secure elements 318 and/or 320 may be a near field communication execution environment (NFCEE), a virtual secure element, etc. In an aspect, first and/or second secure elements 318 and/or 320 may include a Universal Integrated Circuit Card (UICC) with various modules such as but not limited to, a subscriber information module (SIM), a CDMA Subscriber Identity Module (CSIM), or any other secure computing environment or secure element known in the art. In another aspect, each secure element may distinguished by the NFC controller 326 using a secure element identifier for use during the RF discovery process.

Communications device 302 may include an NFC controller (NFCC) 326, which may be configured to facilitate NFC operation of communications device 302. In an aspect, NFCC 326 may include a data routing component 328, which may control data routing between components in communications device 302 and/or external devices in communications network 300. Furthermore, data routing component 328 may utilize one or more routing data structures 330, which may govern the data routing operation of data routing component 328. For example, a routing data structure 330 may include one or more entries that may hold application identifiers (AIDs) corresponding to application information stored in one or more secure elements, such as, but not limited to first secure element 318 and/or an optional second secure element 320. In an example, first secure element 318 may include first application information 322 and second secure element 320 may include second application information 324. In a further aspect, routing data structures 330, first application information 322, and/or second application information 324 may be stored in nonvolatile memory. Alternatively, routing data structures 330, first application information 322, and/or second application information 324 may be stored in volatile memory.

Furthermore, data routing component 328 may include a compression component 332, which may be configured to compress application identifiers (AID) and place the value of the compressed AID 335 into an entry in routing data structure 330. In addition, compression component 332 may utilize hash function 333, which may govern the compression of an uncompressed, original AID (e.g. a received AID 317 in a routing request message 316) according to one or more programmed functions operable to spread incoming AIDs substantially uniformly throughout entries in routing data structure 330. Further, compression component 332 may be operable to extract one or more AIDs 317 from a routing request message and read one or more AIDs from the corresponding routing table entry as defined by hash function 333. In an aspect, hash function 333 may include any function (e.g. executable by a processor) that may take an AID as an input and may output a corresponding entry location or location identifier. In some non-limiting examples, hash function 333 may be a perfect hash function. Such perfect hash functions are configured to completely avoid collisions—which may be defined as instances where more than one data item (e.g. AID) are written to a single data structure entry.

Furthermore, NFC controller 326 may include a secure element querying component, which may be configured to query one or more secure elements (e.g. first secure element 318 and second secure element 320) for the presence of an application associated with a requested AID. In an aspect, secure element querying component 331 may query a single secure element, such as when an entry corresponding to the requested AID contains a single secure element location entry. In some other non-limiting examples, secure element querying component 331 may query a plurality of secure elements, such as when the entry corresponding to the requested AID contains more than one secure element location entries. In such examples, the secure element querying component 331 may query the secure elements substantially contemporaneously (e.g. in parallel). Furthermore, because there exists one true secure element location for each requested application, the NFC controller 326 can receive only a single element response indicating that the secure element contains the requested AID. Thus, such contemporaneous querying does not include the risk of prematurely and incorrectly selecting a secure element associated with the requested application, which may occur in instances where more than one true secure element location exist.

Communication device 302 may include NFC controller interface (NCI) 336. In an aspect, NCI 336 may be operable to enable communications between a NFC enabled antenna and NFC controller 326. Furthermore, NCI 336 may be operable to function in a listening mode and/or a polling mode. Additionally, NCI 336 may enable communications between NFC controller 326 and one or more of DH 334, secure elements, such as first and second secure elements 318 and 320, and/or any other component of communications device 302 or communications network 300.

In a further aspect, communications device 302 may include a device host (DH) 334, which may serve as the master controller for communications network 300. Furthermore, DH 334 may be responsible for the configuration of the NFCC 326 and may communicate with antenna 304.

Additionally, communications network 300 may include a remote secure element server 340. Remote secure element server 340 may communicate with communications device 302 and/or provide server application information 342 to one or more components in communications device 302. By way of example and not limitation, remote secure element server 340 may provide secure application information 342 to one or more secure elements on communications device 302, such as, but not limited to first and/or second secure element 318 and/or 320. In an aspect, remote secure element server 340 and/or communication device 302 may be operable to communicate through NCI 336 and/or an RF interface (not shown). In another aspect, remote secure element server 340 may be operable to communicate with communications device 302 using an access network and/or core network (e.g., a CDMA network, a GPRS network, a UMTS network, and other types of wireline and wireless communication networks).

Therefore, communications network 300 and communications device 302 provide a cost- and space-efficient, optimized, and simplified system for memory savings in an NFC device.

Figure 4:
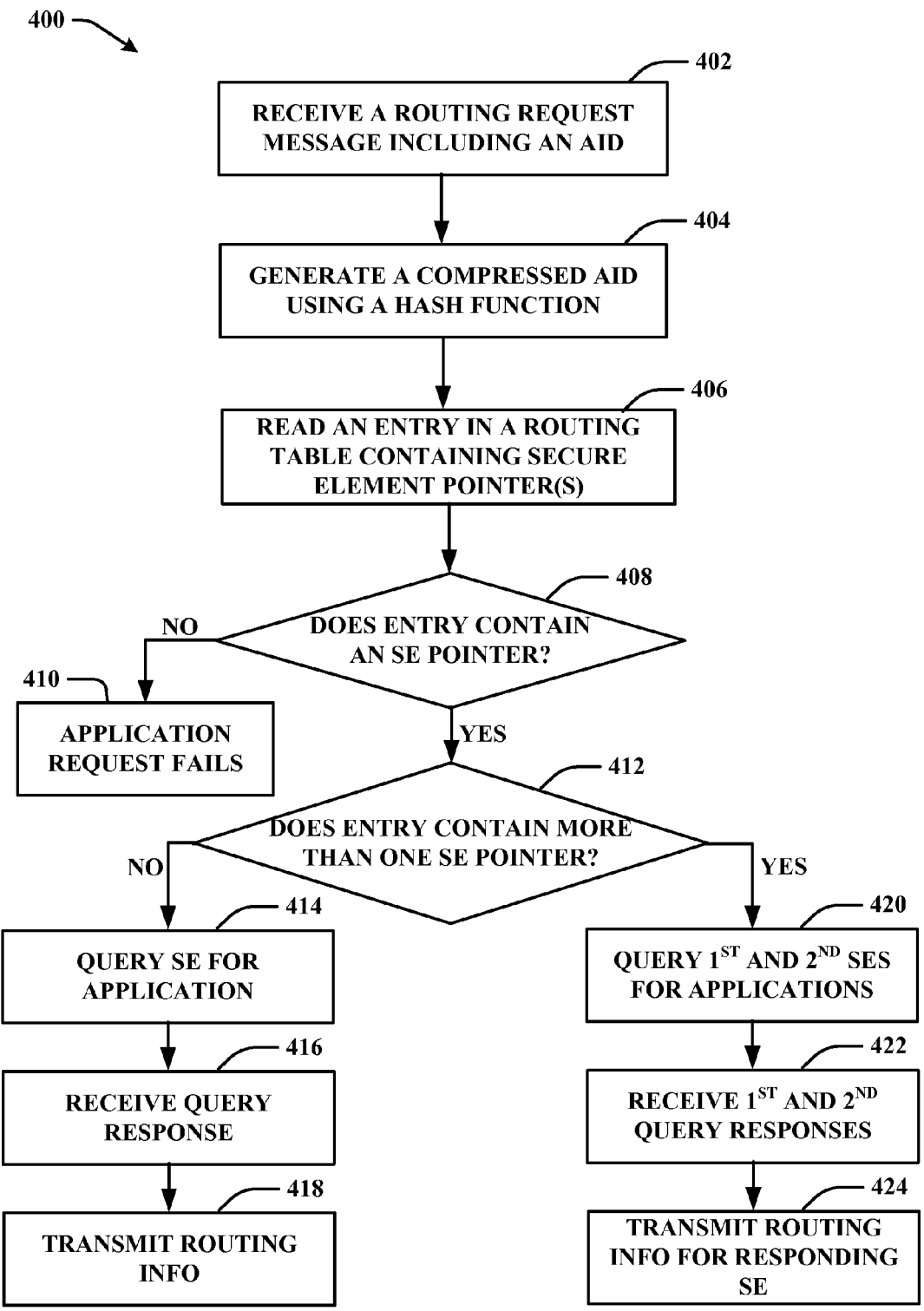
FIG. 4 is a flowchart describing an example method for improving near field communication routing information storage according to an aspect.

FIG. 4 illustrates various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference now to FIG. 4, an example flowchart describing a method 400 for optimizing NFC device memory usage is illustrated. In an example, when a secure element (SE) is added to an NFC device or environment, the NFC controller (NFCC) may add the location of any application information on the SE to a routing data structure in the NFCC. Additionally, each application and its application information may contain an identifier, sometimes referred to as an application ID, or AID. In some aspects, the location of the application information corresponding to a particular AID may be stored in the routing data structure according to a compressed version of the AID. This compression may be realized by implementing a hash function on the AID and storing the AID location in the routing data structure in an entry according to its hash function output. However, by nature, compression by use of hashing may result in more than one AID in a given entry in the routing data structure, which may be referred to as "collision."

Because each input in a hash function has a time-invariant output, when an external device or a component on the NFC device later requests access to application information on a SE, the NFC device may hash the full AID in the request message to find the application's corresponding entry in the hash table. Using the SE or SEs location indicators in the hash table entry, the NFC device may decipher the location of the requested application and allow the requesting device or component access to the correct SE and application data. Additionally, where collision is discovered when sampling an entry, the NFC device may determine which of the SEs corresponding to the multiple SE pointers in the entry contains the correct application data.

More specifically, referring to block 402, a NFC device may receive, for example, at an NFCC, a routing request message, such as, but not limited to, from an external device or a component in the NFC device. In a further aspect, the routing request message may contain an original AID, which may be an uncompressed AID, of the target application the external device attempts to access. Additionally, at block 404, the NFCC may generate a compressed AID by applying the original AID to a hash function and obtaining a resulting compressed AID as the output. Once the compressed AID has been generated, at block 406, the NFCC may read a routing table entry, which may contain one or more secure element (SE) pointers or may contain no SE pointers. At block 408, the NFCC may determine if the entry contains an SE pointer. Where the entry does not contain an SE pointer, at block 410, the application request fails and the NFC device may inform the requesting device or component of a NULL result and/or an undefined path.

Alternatively, if the entry contains an SE pointer, the NFCC may determine if the entry contains more than one SE pointer at block 412. Where the entry does not contain more than one SE pointer, or, in other words, contains only one SE pointer, at block 414, the NFCC may query the SE corresponding to the SE pointer to determine if the SE contains the target application data. Furthermore, at block 416, the NFCC may receive a query response from the SE indicating that the SE contains the application data. Where the query response indicates that the SE contains the application data, at block 418, the NFC device may transmit routing information for the secure element to the requesting device or component to allow the SE and the requesting device or component to form a communicative connection. Alternatively, where the query response indicates that the SE does not contain the target application data, the NFC device may inform the requesting device or component of a NULL result and/or an undefined path.

In an alternative aspect, where the NFCC determines that the routing table entry contains more than one SE pointer at block 412, the NFCC may query a first secure element and a second secure element by sending each secure element a query message to determine whether each of the secure elements contains the target application data at block 420. In an aspect, the NFCC may send the query messages sequentially, or, alternatively, may send the query messages in parallel.

Additionally, the NFCC may receive first and second query responses in response to the queries of the first secure element and the second secure element at block 422. In an aspect, at block 422, the first query response may indicate that the first secure element does not contain the target application data and the second query response may indicate that the second secure element contains the target application data, or visa versa. Furthermore, it should be appreciated that the number of secure elements contemplated by the present disclosure is not limited to two. Instead, any number of secure elements, and therefore any number of query messages and/or query responses may be sent or received.

As a result, at block 424, the secure element that indicates that it contains the target application data may respond and the NFC device may transmit routing information for the responding secure element to the requesting device to allow the responding secure element and the requesting device to form a communicative connection. Therefore, method 400 provides a method for optimizing NFC device memory usage through AID compression.

Figure 5:
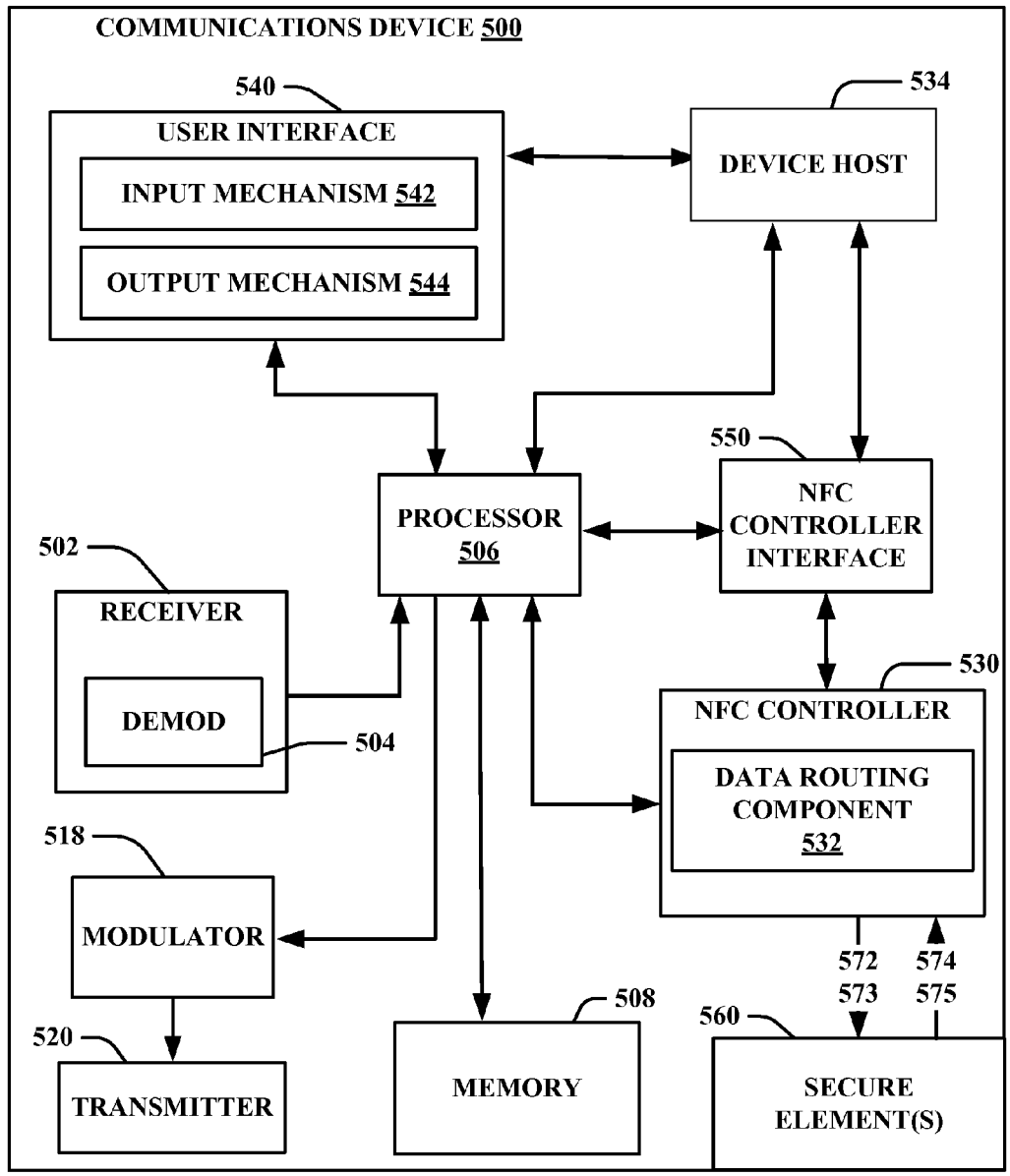
FIG. 5 is a block diagram of aspects of a communications device according to the present disclosure.

While referencing FIG. 3, but turning also now to FIG. 5, an example architecture of communication device 500 is illustrated. As depicted in FIG. 5, communication device 500 comprises receiver 502 that receives a signal from, for instance, a receive antenna (not shown), performs typical actions on (e.g., filters, amplifies, downconverts, etc.) the received signal, and digitizes the conditioned signal to obtain samples. Receiver 502 can comprise a demodulator 504 that can demodulate received symbols and provide them to processor 506 for channel estimation. Processor 506 can be a processor dedicated to analyzing information received by receiver 502 and/or generating information for transmission by transmitter 520, a processor that controls one or more components of device 500, and/or a processor that both analyzes information received by receiver 502, generates information for transmission by transmitter 520, and controls one or more components of communication device 500. Further, signals may be prepared for transmission by transmitter 520 through modulator 518 which may modulate the signals processed by processor 506.

Communication device 500 can additionally comprise memory 508 that is operatively coupled to processor 506 and that can store data to be transmitted, received data, information related to available channels, TCP flows, data associated with analyzed signal and/or interference strength, information related to an assigned channel, power, rate, or the like, and any other suitable information for estimating a channel and communicating via the channel. Further, processor 506 and/or device host 534 can provide means for controlling an NFC system.

It will be appreciated that data store (e.g., memory 508) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 508 of the subject systems and methods may comprise, without being limited to, these and any other suitable types of memory.

In another aspect, communication device 500 may include NFC controller interface (NCI) 550. In an aspect, NCI 550 may be operable to enable communications between a NFC enabled antenna (e.g., 502, 520) and NFC controller 530. NCI 550 may be configurable to function in a listening mode and/or a polling mode.

In another aspect, communication device 500 may include one or more secure elements 560. In an aspect, the one or more secure elements 560 may be coupled to NFC controller 530. Further, the one or more secure elements 560 may include one or more applications that are operable to request access to various functionalities availability through NFC controller 530. In an aspect, the one or more secure elements 560 may be secure elements or near field controller execution environments (NFCEEs). In an aspect, the one or more secure elements 560 may include a UICC with various modules such as but not limited to, a SIM, a CSIM, etc. In another aspect, the one or more secure elements 560 may be assigned an index as a secure element identifier and may be operable to use settings indicated through a configuration parameter that may be used during the secure data routing information loading and utilization process described with respect to FIGS. 4 and 5.

Communication device 500 may include a NFC controller 530. In an aspect, NFCC 530 may include a data routing component 532. This data routing component 532 may be configured to compress one or more application identifiers in an application request message and store and/or retrieve the AIDs in/from a routing data structure. In an aspect, communication device 500 may include one or more secure elements 560, which may store application information associated with an application requested by and/or executable on a requesting device (e.g. requesting device 306, FIG. 3). In a further aspect, NFC controller 530 (e.g. through data routing component 532) may send one or more queries (e.g. first query 572 and/or second query 573, though not limited to two) to the one or more secure elements 560. These one or more queries may query one or more of secure elements 560 as to whether it is storing an application associated with a compressed AID that may be included in the query. In a further aspect, each queried secure element 560 may generate and/or send one or more query responses (e.g. first query response 574 and/or second query response 575, though not limited to two) to NFC controller 530, which may indicate whether the sending secure element is storing the application associated with the compressed AID.

Additionally, communication device 500 may include user interface 540. User interface 540 may include input mechanisms 542 for generating inputs into communication device 500, and output mechanism 544 for generating information for consumption by the user of the communication device 500. For example, input mechanism 542 may include a mechanism such as a key or keyboard, a mouse, a touch-screen display, a microphone, etc. Further, for example, output mechanism 544 may include a display, an audio speaker, a haptic feedback mechanism, a Personal Area Network (PAN) transceiver etc. In the illustrated aspects, the output mechanism 544 may include a display operable to present media content that is in image or video format or an audio speaker to present media content that is in an audio format.

Figure 6:
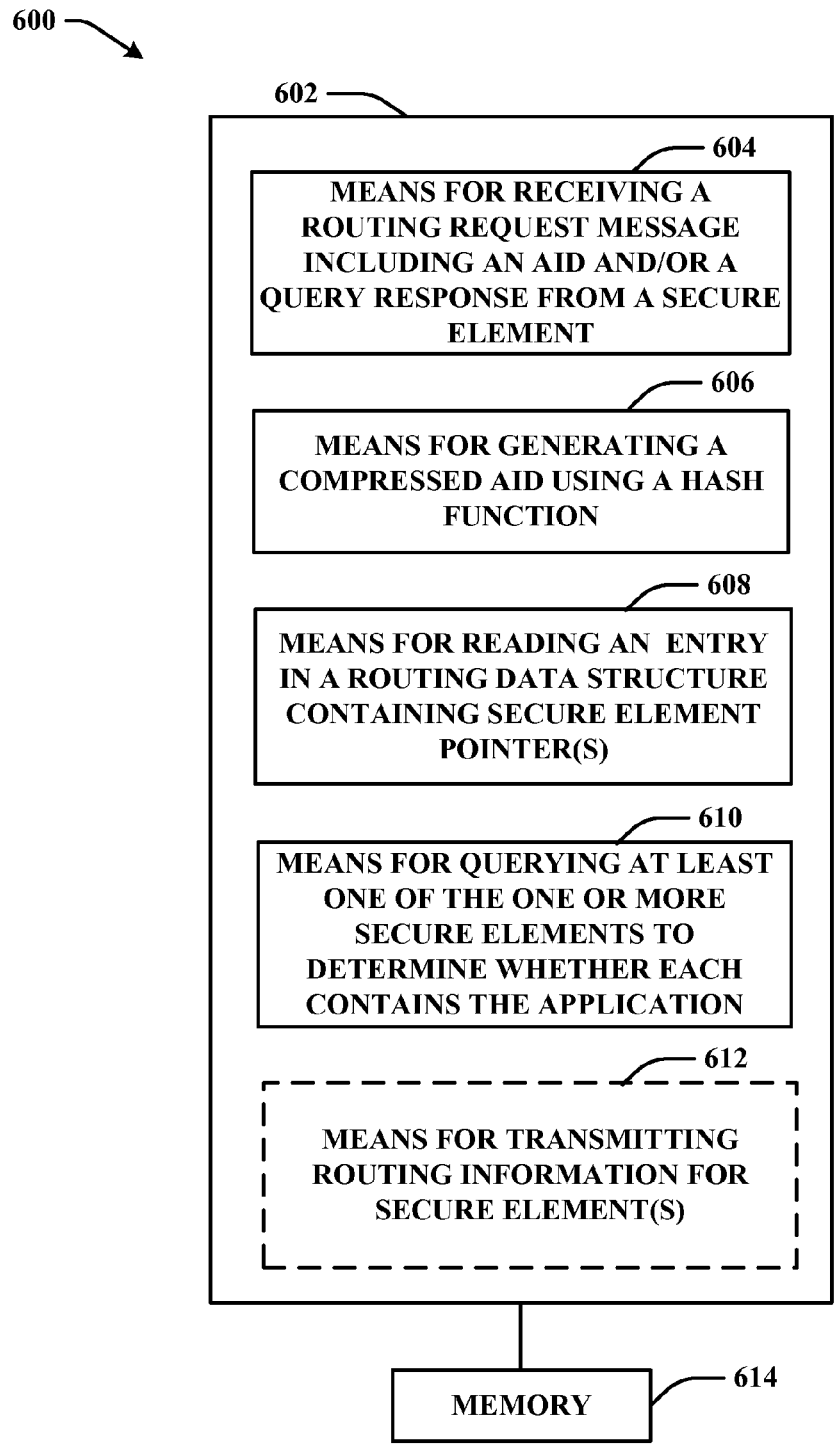
FIG. 6 is an example logical grouping of electrical components configured for improved routing of application requests in NFC devices.

Referring to FIG. 6, an example system 600 is displayed for improved application request routing in NFC devices. For example, system 600 can reside at least partially within one or more NFC devices. It is to be appreciated that system 600 is represented as including functional blocks, which can be functional blocks that represent functions implemented by a processor, software, or combination thereof (e.g., firmware). System 600 includes a logical grouping 602 of electrical components that can act in conjunction. For instance, logical grouping 602 can include means for receiving a routing request message that includes an AID and/or a query response from a secure element (Block 604). For example, in an aspect, the means 604 may include receiver 208 (FIG. 2), receiver 502 (FIG. 5), and/or secure element querying component 331 (FIG. 3). Additionally, logical grouping 602 can include means for generating a compressed AID using a hash function (Block 606). For example, in an aspect, the means 606 may include compression component 332 (FIG. 3). In an additional aspect, logical grouping 602 can include means for reading an entry containing secure element pointer(s) (Block 608). In an aspect, the means 608 may comprise data routing component 328 (FIG. 3). Furthermore, logical grouping 602 can include means for querying at least one of the one or more secure elements to determine whether each contains the application (Block 610). In an aspect, the means 610 may comprise secure element querying component 331 (FIG. 3). Additionally, in an optional aspect, logical grouping 602 can include means for transmitting routing information for one or more secure elements to the requesting device (Block 612). In an aspect, the means 612 may comprise transmitter 204 (FIG. 2) and/or transmitter 520 (FIG. 5).

Additionally, system 600 can include a memory 614 that retains instructions for executing functions associated with the electrical components 604, 606, 608, 610, and 612, stores data used or obtained by the electrical components 604, 606, 608, 610, and 612, etc. While shown as being external to memory 614, it is to be understood that one or more of the electrical components 604, 606, 608, 610, and 612 can exist within memory 614. In a further aspect, for example, memory 614 may be the same as or similar to memory 508 (FIG. 5). In another aspect, memory 614 may be associated with device host 534 and/or NFCC 530 (FIG. 5).

In one example, electrical components 604, 606, 608, 610, and 612 can comprise at least one processor, or each electrical component 604, 606, 608, 610, and 612 can be a corresponding module of at least one processor. Moreover, in an additional or alternative example, electrical components 604, 606, 608, 610, and 612 can be a computer program product including a computer readable medium, where each electrical component 604, 606, 608, 610, and 612 can be corresponding code.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, mobile equipment (ME), remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH, near-field communications (NFC-A, NFC-B, NFC-F, etc.), and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method of communication routing in a near-field communication device, comprising:
   receiving, at a near-field communications controller (NFCC), a routing request message, wherein the routing request message includes an original application identifier (AID) associated with an application;
   generating a compressed AID by applying a hash function to the original AID;
   reading an entry corresponding to the compressed AID, the entry in a routing data structure, wherein the entry contains one or more secure element pointers associated with one or more secure elements; and
   querying at least one of the one or more secure elements to determine whether each of the queried elements contains the application.

2. The method of claim 1, wherein the entry contains one secure element pointer, the method further comprising:
   receiving, a query response indicating that a secure element contains the application; and
   transmitting routing information for the secure element.

3. The method of claim 1, wherein the entry contains more than one secure element pointer, the method further comprising:
   receiving a first query response indicating that a first secure element does not contain the application, and a second query response indicating that a second secure element contains the application; and
   transmitting routing information for the second secure element.

4. The method of claim 3, wherein the querying includes contemporaneously sending a first query to a first secure element and a second query to a second secure element.

5. The method of claim 4, wherein the one or more secure elements comprise three or more secure elements.

6. The method of claim 3, wherein the querying comprises sequentially sending a first query and a second query.

7. An apparatus for communication routing in a near-field communication device, comprising:
   means for receiving, at a near-field communications controller (NFCC), a routing request message, wherein the routing request message includes an original application identifier (AID) associated with an application;
   means for generating a compressed AID by applying a hash function to the original AID;
   means for reading an entry corresponding to the compressed AID, the entry in a routing data structure, wherein the entry contains one or more secure element pointers associated with one or more secure elements; and
   means for querying at least one of the one or more secure elements to determine whether each of the queried elements contains the application.

8. The apparatus of claim 7, wherein the entry contains one secure element pointer, and wherein the means for receiving is further configured to receive a query response indicating that a secure element contains the application; and
   further comprising means for transmitting routing information for the secure element.

9. The apparatus of claim 7, wherein the entry contains more than one secure element pointer, and wherein the means for receiving is further configured to receive a first query response indicating that a first secure element does not contain the application, and a second query response indicating that a second secure element contains the application; and
   further comprising means for transmitting routing information for the second secure element.

10. The apparatus of claim 9, wherein the means for querying is further configured to contemporaneously send a first query to the first secure element and a second query to the second secure element.

11. The apparatus of claim 10, wherein the one or more secure elements comprises three or more secure elements.

12. The apparatus of claim 9, wherein the means for querying is further configured to sequentially send a first query to the first secure element and a second query to the second secure element.

13. A non-transitory computer-readable medium storing executable code for:
   receiving, at a near-field communications controller (NFCC), a routing request message, wherein the routing request message includes an original application identifier (AID) associated with an application;
   generating a compressed AID by applying a hash function to the original AID;
   reading an entry corresponding to the compressed AID, the entry in a routing data structure, wherein the entry contains one or more secure element pointers associated with one or more secure elements; and
   querying at least one of the one or more secure elements to determine whether each of the queried elements contains the application.

14. The non-transitory computer-readable medium of claim 13, wherein the entry contains one secure element pointer, the computer-readable medium further comprising executable code for:
   receiving a query response indicating that a secure element contains the application; and
   transmitting routing information for the secure element.

15. The non-transitory computer-readable medium of claim 13, wherein the entry contains more than one secure element pointer, the computer-readable medium further comprising executable code for:
   receiving a first query response indicating that a first secure element does not contain the application, and a second query response indicating that a second secure element contains the application; and
   transmitting routing information for the second secure element.

16. The non-transitory computer-readable medium of claim 15, wherein the querying includes contemporaneously sending a first query to the first secure element and a second query to the second secure element.

17. The non-transitory computer-readable medium of claim 16, wherein the one or more secure elements comprises three or more secure elements.

18. The non-transitory computer-readable medium of claim 15, wherein the querying includes sequentially sending a first query to the first secure element and a second query to the second secure element.

19. An apparatus for communication routing, comprising:
   a receiver configured to receive, at a near-field communications controller (NFCC), a routing request message, wherein the routing request message includes an original application identifier (AID) associated with an application;
   a compression component configured to generate a compressed AID by applying a hash function to the original AID;
   a data routing component configured to read an entry corresponding to the compressed AID, the entry in a routing data structure, wherein the entry contains one or more secure element pointers associated with one or more secure elements; and
   a secure element querying component configured to query at least one of the one or more secure elements to determine whether each of the queried elements contains the application.

20. The apparatus of claim 19, wherein the entry contains one secure element pointer, and wherein the secure element querying component is further configured to receive a query response indicating that a secure element contains the application; and
   further comprising a transmitter for transmitting routing information for the secure element.

21. The apparatus of claim 19, wherein the entry contains more than one secure element pointer, and wherein the secure element querying component is further configured to receive a first query response indicating that a first secure element does not contain the application, and a second query response indicating that a second secure element contains the application; and
   further comprising a transmitter configured to transmit routing information for the second secure element.

22. The apparatus of claim 21, wherein the secure element querying component is further configured to contemporaneously send a first query to the first secure element and a second query to the second secure element.

23. The apparatus of claim 22, wherein the one or more secure elements comprises three or more secure elements.

24. The apparatus of claim 21, wherein the secure element querying component is further configured to sequentially send a first query to the first secure element and a second query to the second secure element.

* * * * *